United States Patent
Han et al.

(10) Patent No.: US 11,680,190 B2
(45) Date of Patent: Jun. 20, 2023

(54) OPTICAL LAMINATE

(71) Applicant: SHANJIN OPTOELECTRONICS (SUZHOU) CO., LTD., Zhangjiagang (CN)

(72) Inventors: Seul Ki Han, Daejeon (KR); Dong Hun Lee, Daejeon (KR); Hyun Hee Son, Daejeon (KR)

(73) Assignee: Shanjin Optoelectronics (Suzhou) Co., Ltd., Zhangjiagang (CN)

( * ) Notice: Subject to any disclaimer, the term of this patent is extended or adjusted under 35 U.S.C. 154(b) by 319 days.

(21) Appl. No.: 16/761,651

(22) PCT Filed: Nov. 9, 2018

(86) PCT No.: PCT/KR2018/013588
§ 371 (c)(1),
(2) Date: May 5, 2020

(87) PCT Pub. No.: WO2019/093803
PCT Pub. Date: May 16, 2019

(65) Prior Publication Data
US 2021/0130655 A1     May 6, 2021

(30) Foreign Application Priority Data
Nov. 10, 2017   (KR) .................. 10-2017-0149551

(51) Int. Cl.
| | | |
|---|---|---|
| C09J 7/38 | (2018.01) | |
| C09J 7/24 | (2018.01) | |
| B32B 7/12 | (2006.01) | |
| B32B 23/08 | (2006.01) | |
| B32B 23/20 | (2006.01) | |
| B32B 27/30 | (2006.01) | |
| B32B 27/32 | (2006.01) | |
| C09J 133/08 | (2006.01) | |
| G02B 5/30 | (2006.01) | |
| C08K 3/105 | (2018.01) | |

(52) U.S. Cl.
CPC ............... *C09J 7/381* (2018.01); *B32B 7/12* (2013.01); *B32B 23/08* (2013.01); *B32B 23/20* (2013.01); *B32B 27/306* (2013.01); *B32B 27/325* (2013.01); *C09J 7/245* (2018.01); *C09J 133/08* (2013.01); *G02B 5/305* (2013.01); *B32B 2307/42* (2013.01); *B32B 2307/51* (2013.01); *B32B 2457/20* (2013.01); *C08K 3/105* (2018.01); *C09J 2203/318* (2013.01); *C09J 2301/312* (2020.08); *C09J 2433/00* (2013.01)

(58) Field of Classification Search
None
See application file for complete search history.

(56) References Cited

U.S. PATENT DOCUMENTS

| | | | | |
|---|---|---|---|---|
| 2008/0278672 | A1* | 11/2008 | Yano ........................ | C09J 7/22 349/193 |
| 2009/0040611 | A1* | 2/2009 | Kitamura ........... | B29D 11/0073 264/1.34 |
| 2010/0086706 | A1 | 4/2010 | Everaerts et al. | |
| 2012/0100359 | A1* | 4/2012 | Kishioka ................ | C09J 133/14 428/220 |
| 2012/0253061 | A1* | 10/2012 | Takahashi .............. | G02B 30/25 359/464 |
| 2013/0114137 | A1* | 5/2013 | Bae ....................... | G02B 5/3083 427/163.1 |
| 2013/0288048 | A1* | 10/2013 | Toyama ................. | C09J 175/04 524/558 |
| 2013/0330544 | A1* | 12/2013 | Toyama ................. | C09J 175/04 427/208.4 |
| 2014/0347727 | A1* | 11/2014 | Inui ....................... | G02B 5/3025 359/483.01 |

FOREIGN PATENT DOCUMENTS

| | | | | |
|---|---|---|---|---|
| CN | 1715968 | A | 1/2006 | |
| CN | 105102572 | A | 11/2015 | |
| EP | 2727973 | A1 * | 5/2014 | ............ C09J 133/06 |
| EP | 2727973 | A1 | 5/2014 | |
| JP | 2008/249901 | * | 10/2008 | ............... G02B 5/30 |
| JP | 2008249901 | A | 10/2008 | |
| JP | 2011/225764 | * | 11/2011 | ............ B32B 27/00 |
| JP | 2011225764 | A | 11/2011 | |
| KR | 20080099177 | A | 11/2008 | |
| KR | 20090015801 | A | 2/2009 | |
| KR | 100960731 | B1 | 5/2010 | |
| KR | 20110068972 | A | 6/2011 | |
| KR | 2014/0120262 | * | 10/2014 | ............ C09J 133/06 |

(Continued)

OTHER PUBLICATIONS

Matsumoto —JP 2008-249901 A—ISR D1—MT+Google—polarizer & display—2008 (Year: 2008).*
Ota—JP 2011-225764 A—ISR D8—MT—optical adhesive—2011 (Year: 2011).*
Choi—KR 2014-0120262 A—ISR D2—MT—optical adhesive—2014 (Year: 2014).*
Muroi—WO 2016-194715 A1—ISR D9—MT—polarizing plate w-adhesive—2016 (Year: 2016).*
Misumi—TW 2017-13741 A—TWpat. D1—MT—adhesive for polarizing plate—2017 (Year: 2017).*
Asatsu—WO 2017-104349 A1—Euro. D1—sister of Jap.Pat.D1—MT—adhesive comp, w-hydroxy+aromatic+organic salt—2017 (Year: 2017).*

(Continued)

*Primary Examiner* — John Vincent Lawler
(74) *Attorney, Agent, or Firm* — Schmeiser, Olsen & Watts, LLP

(57) ABSTRACT

An optical laminate is provided where stable durability is secured even at a high temperature, particularly an ultrahigh temperature of about 100° C. or higher, a foaming phenomenon or the like in a pressure-sensitive adhesive layer is also suppressed or prevented, other physical properties required for the optical laminate are also excellent, and even in the case of being disposed adjacent to the electrode, corrosion of the relevant electrode or the like is not induced.

20 Claims, No Drawings

(56) References Cited

FOREIGN PATENT DOCUMENTS

| KR | 20140120262 A | 10/2014 | | |
|---|---|---|---|---|
| KR | 101766934 B1 | 8/2017 | | |
| TW | 2017/13741 | * | 4/2017 | ............ C09J 11/06 |
| TW | 201713741 A | | 4/2017 | |
| WO | 2014163329 A1 | 10/2014 | | |
| WO | 2016194715 A1 | 12/2016 | | |
| WO | WO-2016194715 A1 | * | 12/2016 | ............ C09J 11/06 |
| WO | WO-2017104349 A1 | * | 6/2017 | ............ C09J 11/06 |

OTHER PUBLICATIONS

Millipore-Sigma—Benzyl acrylate—May 13, 2022 (Year: 2022).*
PubChem—2-Phenoxyethyl acrylate _ 011H12O3—May 16, 2022 (Year: 2022).*
International Search Report for Application No. PCT/KR2018/013588 dated Feb. 18, 2019, 2 pages.
Taiwan Search report for Application No. 107139838 dated Apr. 29, 2019, 1 page.
European Search Report for Application No. EP 18875674, dated Oct. 14, 2020, 14 pages.

* cited by examiner

OPTICAL LAMINATE

CROSS REFERENCE TO RELATED APPLICATIONS

The present application is a national stage entry under 35 U.S.C. § 371 of International Application No. PCT/KR2018/013588 filed on Nov. 9, 2018, which claims priority to Korean Patent Application No. 10-2017-0149551 filed on Nov. 10, 2017, the disclosure of which is incorporated herein by reference in its entirety.

TECHNICAL FIELD

The present application relates to an optical laminate.

BACKGROUND ART

Various optical films such as a polarizing plate are applied to various display devices such as an LCD (liquid crystal display) or an OLED (organic light emitting diode). Such an optical film is generally attached to a display device by a pressure-sensitive adhesive.

As applications of the display device are expanded, high reliability is required for the optical film and the pressure-sensitive adhesive. For example, optical films and pressure-sensitive adhesives used in navigation or automotive displays, and the like are required to stably maintain their performance even when they are kept at a very high temperature for a long period of time.

A polarizing plate, which is a typical optical film, is a multi-layered structure including a polarizer as an element exhibiting a polarizing function and a protective film for protecting the polarizer. As the protective film of the polarizer, a so-called TAC (triacetyl cellulose) film is used, but a so-called low moisture-permeable protective film having a low water vapor transmission rate is also used.

DISCLOSURE

Technical Problem

The present application relates to an optical laminate.

Technical Solution

The optical laminate of the present application comprises an optical element and a pressure-sensitive adhesive layer formed on one side or both sides of the optical element. If necessary, a release film may be attached on the pressure-sensitive adhesive layer formed on one side or both sides of the optical element.

The optical laminate may comprise an optical element including an optical film having a water vapor transmission rate of 100 g/(m²·day) or less as measured at a temperature of 37° C. and 88.5% relative humidity for 24 hours and a pressure-sensitive adhesive layer formed on one side of the optical element. The pressure-sensitive adhesive layer may comprise a pressure-sensitive adhesive polymer having an alkyl (meth)acrylate unit having an alkyl group with 4 or more carbon atoms, an alkyl (meth)acrylate unit having an alkyl group with 3 or less carbon atoms, an aromatic group-containing monomer unit and a polar functional group-containing monomer unit. The pressure-sensitive adhesive layer may have a ratio of a loss tangent (tan δ) at 100° C. to a loss tangent (tan δ) at 30° C. of 1.7 or less, and a gel fraction of 70 wt % or more, according to Equation 1 below:

$$\text{Gel content} = B/A \times 100 \quad [\text{Equation 1}]$$

wherein, A is a mass (unit: g) of the pressure-sensitive adhesive layer before immersing the pressure-sensitive adhesive layer in ethyl acetate, and B is a dry mass (unit: g) of an insoluble fraction recovered after immersing the pressure-sensitive adhesive layer in ethyl acetate at room temperature for 24 hours.

The type of the optical element included in the optical laminate of the present application is not particularly limited, and various types used in various display devices may be included. For example, the optical element may be exemplified by a polarizing plate, a polarizer, a polarizer protective film, a retardation film, a viewing angle compensation film or a luminance enhancement film, and the like. In the present application, the term polarizer and polarizing plate refers to subjects that are distinguished from each other. The polarizer refers to a film, sheet or element itself exhibiting a polarization function, and the polarizing plate means an optical element including other elements together with the polarizer. Other elements that can be included in the optical element together with the polarizer can be exemplified by a polarizer protective film or a retardation layer, and the like, but is not limited thereto.

The optical element of the present application may comprise at least a so-called low moisture-permeable optical film. In the present application, the term low moisture-permeable optical film is an optical film having a low water vapor transmission rate, which means, for example, an optical film having a water vapor transmission rate (WVTR) of about 100 g/(m²·day) or less as measured at a temperature of 37° C. and 88.5% relative humidity for 24 hours. Here, the relative humidity may have some errors, and the error range may be within ±0.5%, within ±0.3% or within ±0.1%. In one example, the water vapor transmission rate may be about 95 g/(m²·day) or less, 90 g/(m²·day) or less, 85 g/(m²·day) or less, 80 g/(m²·day) or less, 75 g/(m²·day) or less, 70 g/(m²·day) or less, 65 g/(m²·day) or less, 60 g/(m²·day) or less, 55 g/(m²·day) or less, 50 g/(m²·day) or less, 45 g/(m²·day) or less, 40 g/(m²·day) or less, 35 g/(m²·day) or less, 30 g/(m²·day) or less, 25 g/(m²·day) or less, 20 g/(m²·day) or less, 15 g/(m²·day) or less, 10 g/(m²·day) or less, 8 g/(m²·day) or less, or 6 g/(m²·day) or less. The lower limit of the water vapor transmission rate is not particularly limited, but may be about 0.01 g/(m²·day) or more, 0.1 g/(m²·day) or more, 0.5 g/(m²·day) or more, 1 g/(m²·day) or more, 1.5 g/(m²·day) or more, 2 g/(m²·day) or more, 2.5 g/(m²·day) or more, 3 g/(m²·day) or more, 3.5 g/(m²·day) or more, 4 g/(m²·day) or more, or 4.5 g/(m²·day) or more or so. The thickness of the optical film having the water vapor transmission rate is not particularly limited. That is, an optical film having a thickness generally applicable to an optical film and exhibiting the water vapor transmission rate at the relevant thickness can be applied to the optical element of the present application. In one example, the thickness of the optical film may be in a range of about 10 μm to 100 μm. The water vapor transmission rate can be measured according to a method known in the art. As a representative standard for measuring the water vapor transmission rate, ASTM F1249 or ISO15506-3, and the like are known, and the water vapor transmission rate of the present application is measured according to the appropriate method of the foregoing.

Various types of such low moisture-permeable optical films are known, which can be exemplified by, for example, a cycloolefin polymer (COP) film or an acrylic film, or a polyester film such as a PET (poly(ethylene terephthalate)) film, but are not limited thereto.

Such films are usually used as protective films for polarizers, or as materials for retardation films and the like.

When such a low moisture-permeable film forms an optical laminate together with the pressure-sensitive adhesive layer, a foaming phenomenon is likely to occur in the pressure-sensitive adhesive due to the low water vapor transmission rate of the relevant film, and in particular, the foaming phenomenon is more easily caused under an ultra-high-temperature condition of 100° C. or higher.

However, even when such a low moisture-permeable optical film is applied, the pressure-sensitive adhesive of the present application also exhibits no foaming phenomenon while stably maintaining durability.

A typical example of the optical element comprising such a low moisture-permeable film includes a polarizing plate. Such a polarizing plate may comprise the low moisture-permeable optical film together with a polarizer exhibiting a polarizing function, where such a low moisture-permeable optical film may be included in the polarizing plate as a protective film for the polarizer or a retardation film.

Therefore, in one example, the polarizing plate may comprise a polarizer and the low moisture-permeable optical film formed on one surface of the polarizer, wherein the low moisture-permeable optical film may have a water vapor transmission rate (40° C., 90% relative humidity, 24 hours) of 100 g/m$^2$·day or less.

In the structure of the polarizing plate, the low moisture-permeable optical film may be formed only on one side of the polarizer, and the low moisture-permeable optical film may be formed on both sides. When it is formed only on one side, no optical film may exists another optical functional layer may exist, or an optical film having a high water vapor transmission rate may exist, on the other side. In the case where the low moisture-permeable optical film is formed only on one side of the polarizer, the low moisture-permeable optical film to be described below may be positioned closer to the pressure-sensitive adhesive layer to be described below than the polarizer.

Basically, the polarizer that can be included in the optical laminate of the present application is not particularly limited. For example, as the polarizer, a polyvinyl alcohol polarizer can be used. The term polyvinyl alcohol polarizer may mean, for example, a resin film of polyvinyl alcohol (hereinafter, may be referred to as PVA) series containing an anisotropic absorbent material such as iodine or a dichroic dye. Such a film can be produced by incorporating an anisotropic absorbent material into a polyvinyl alcohol-based resin film and orienting it by stretching or the like. Here, the polyvinyl alcohol-based resin may include polyvinyl alcohol, polyvinyl formal, polyvinyl acetal or a saponified product of ethylene-vinyl acetate copolymer, and the like. The degree of polymerization of the polyvinyl alcohol-based resin may be 100 to 5,000 or 1,400 to 4,000 or so, but is not limited thereto.

Such a polyvinyl alcohol polarizer can be produced, for example, by performing at least a dyeing process, a crosslinking process and a stretching process on a PVA-based film. In the dyeing step, the crosslinking step and the stretching step, respective treating baths of a dyeing bath, a crosslinking bath and a stretching bath are used, where these respective treating baths can be used by a treating solution according to each process.

In the dyeing process, the anisotropic absorbent material can be adsorbed and/or oriented on the PVA-based film. Such a dyeing process can be performed together with the stretching process. The dyeing can be performed by immersing the film in a solution containing an anisotropic absorbent material, for example, an iodine solution. As the iodine solution, for example, an aqueous solution or the like containing iodine, and iodine ions by an iodinated compound as a dissolution aid may be used. As the iodinate compound, for example, potassium iodide, lithium iodide, sodium iodide, zinc iodide, aluminum iodide, lead iodide, copper iodide, barium iodide, calcium iodide, tin iodide or titanium iodide, and the like may be used. The concentration of iodine and/or iodine ions in the iodine solution can be adjusted in consideration of the desired optical characteristics of the polarizer, and such an adjustment method is known. In the dyeing process, the temperature of the iodine solution is usually 20° C. to 50° C. or 25° C. to 40° C. or so, and the immersion time is usually 10 seconds to 300 seconds or 20 seconds to 240 seconds or so, but is not limited thereto.

The crosslinking process performed during the production process of the polarizer can be performed, for example, using a crosslinking agent such as a boron compound. The order of the crosslinking process is not particularly limited, which can be performed, for example, together with the dyeing and/or drawing process or can proceed separately. The crosslinking process may also be performed several times. As the boron compound, boric acid or borax, and the like may be used. The boron compound can be generally used in the form of an aqueous solution or a mixed solution of water and an organic solvent, and usually an aqueous solution of boric acid is used. The boric acid concentration in the boric acid aqueous solution can be selected in an appropriate range in consideration of the degree of crosslinking and the resulting heat resistance, and the like. The iodinated compound such as potassium iodide can also be contained in an aqueous boric acid solution or the like.

The crosslinking process can be performed by immersing the PVA-based film in an aqueous boric acid solution or the like, where in this process, the treatment temperature is usually in a range of 25° C. or higher, 30° C. to 85° C. or 30° C. to 60° C. or so and the treatment time is usually 5 seconds to 800 seconds or 8 seconds to 500 seconds or so.

The stretching process is generally performed by uniaxial stretching. Such stretching may also be performed together with the dyeing and/or crosslinking process. The stretching method is not particularly limited, and for example, a wet stretching method can be applied. In such a wet stretching method, for example, stretching after dyeing is generally performed, but stretching may be performed with crosslinking, and may also be performed several times or in multiple stages.

The iodinated compound such as potassium iodide can be contained in the treatment liquid applied to the wet stretching method, and in this process, a light blocking rate can also be controlled through adjusting the ratio. In the stretching, the treatment temperature is usually in the range of 25° C. or higher, 30° C. to 85° C. or 50° C. to 70° C., and the treatment time is usually 10 seconds to 800 seconds or 30 seconds to 500 seconds, without being limited thereto.

In the stretching process, the total draw ratio can be controlled in consideration of orientation characteristics and the like, and the total draw ratio may be 3 times to 10 times, 4 times to 8 times or 5 times to 7 times or so based on the original length of the PVA-based film, but is not limited thereto. Here, in the case of involving stretching a swelling process or the like other than the stretching process, the total draw ratio may mean the cumulative draw ratio including the stretching in each process. Such a total draw ratio can be adjusted to an appropriate range in consideration of orientation characteristics, processability or stretching cuttability of the polarizer, and the like.

In the production process of the polarizer, in addition to the dyeing, crosslinking and stretching, the swelling process may also be performed before performing the above process. The contamination of the surface of the PVA-based film or an antiblocking agent can be cleaned by swelling, whereby there is also an effect capable of reducing unevenness such as dyeing deviations.

In the swelling process, water, distilled water or pure water, and the like can be usually used. The main component of the relevant treatment liquid is water, and if necessary, an iodinated compound such as potassium iodide or an additive such as a surfactant, or an alcohol, and the like can be included in a small amount. In this process, the above-described light blocking rate can also be controlled through control of process variables.

The treatment temperature in the swelling process is usually 20° C. to 45° C. or 20° C. to 40° C. or so, but is not limited thereto. Since swelling deviations can cause dyeing deviations, process variables can be adjusted so that the occurrence of such swelling deviations is suppressed as much as possible.

If necessary, appropriate stretching can also be performed in the swelling process. The draw ratio may be 6.5 times or less, 1.2 to 6.5 times, 2 times to 4 times, or 2 times to 3 times, based on the original length of the PVA-based film. The stretching in the swelling process can control the stretching in the stretching process performed after the swelling process to be small, and it can control so that the stretching failure of the film does not occur.

In the production process of the polarizer, metal ion treatment can be performed. This treatment is performed, for example, by immersing the PVA-based film in an aqueous solution containing a metal salt. This allows metal ions to be contained in the polarizer, and in this process, the color tone of the PVA-based polarizer can be controlled by controlling the kind or ratio of metal ions. The applicable metal ions can be exemplified by metal ions of aluminum or a transition metal such as cobalt, nickel, zinc, chromium, copper, manganese or iron, and it may be possible to control the color tone by selecting an appropriate type of these.

In the production process of the polarizer, the cleaning process may proceed after dyeing, crosslinking and stretching. This cleaning process can be performed by a solution of an iodinated compound such as potassium iodide, and in this process, the above-described light blocking rate can be controlled through the concentration of the iodinated compound in the solution or the treatment time of the cleaning process, and the like. Therefore, the concentration of the iodinated compound and the treatment time with the solution can be adjusted in consideration of the light blocking rate. However, the cleaning process may also be performed using water.

Such cleaning with water and cleaning with the iodinated compound solution may also be combined, or a solution in which a liquid alcohol such as methanol, ethanol, isopropyl alcohol, butanol or propanol is blended may also be used.

After these processes, the polarizer can be produced by performing a drying process. The drying process can be performed at an appropriate temperature for an appropriate time, for example, in consideration of the moisture content and the like required for the polarizer, where such conditions are not particularly limited.

In one example, as the polarizer, a polyvinyl alcohol polarizer comprising a potassium component such as potassium ions and a zinc component such as zinc ions may be used for securing durability, particularly high temperature reliability, of the optical laminate. If the polarizer containing such components is used, it is possible to provide an optical laminate in which durability is stably maintained even under high temperature conditions, particularly ultrahigh-temperature conditions of 100° C. or higher.

The ratio of the potassium and zinc components can be further controlled. For example, in one example, the ratio (K/Zn) of the potassium component (K) to the zinc component (Zn) contained in the polyvinyl alcohol polarizer may be in a range of 0.2 to 6. In another example, the ratio (K/Zn) may be about 0.4 or more, 0.6 or more, 0.8 or more, 1 or more, 1.5 or more, 2 or more, or 2.5 or more, and may be 5.5 or less, about 5 or less, about 4.5 or less, or about 4 or less.

In addition, the ratio of the potassium component contained in the polyvinyl alcohol polarizer may be about 0.1 to 2 wt %. In another example, the ratio of the potassium component may be about 0.15 wt % or more, about 0.2 wt % or more, about 0.25 wt % or more, about 0.3 wt % or more, about 0.35 wt % or more, 0.4 wt % or more, or about 0.45 wt % or more, and may be about 1.95 wt % or less, about 1.9 wt % or less, about 1.85 wt % or less, about 1.8 wt % or less, about 1.75 wt % or less, about 1.7 wt % or less, about 1.65 wt % or less, about 1.6 wt % or less, about 1.55 wt % or less, about 1.5 wt % or less, about 1.45 wt % or less, about 1.4 wt % or less, about 1.35 wt % or less, about 1.3 wt % or less, about 1.25 wt % or less, about 1.2 wt % or less, about 1.15 wt % or less, about 1.1 wt % or less, about 1.05 wt % or less, about 1 wt % or less, about 0.95 wt % or less, about 0.9 wt % or less, or about 0.85 wt % or less or so.

In one example, the ratio of the potassium component to the zinc component may be included so as to satisfy Equation A below.

$$0.70 \text{ to } 0.95 = 1/(1+Q \times d/R) \qquad \text{[Equation A]}$$

In Equation A, Q is the ratio (K/Zn) of the molar mass (K, 39.098 g/mol) of the potassium component and the molar mass (Zn, 65.39 g/mol) of the zinc component contained in the polyvinyl alcohol polarizer, d is the thickness (μm)/60 μm of the polyvinyl alcohol polarizer before stretching, R is the ratio (K/Zn) of the weight ratio (K, unit:weight %) of the potassium component and the weight ratio (Zn, unit:weight %) of the zinc component contained in the polyvinyl alcohol polarizer.

By comprising potassium and zinc components in a polarizer in the above manner, it is possible to provide a polarizer having excellent reliability at a high temperature.

The thickness of such a polarizer is not particularly limited, where the polarizer may be formed to have an appropriate thickness depending on the purpose. Typically, the thickness of the polarizer may be in a range of 5 μm to 80 μm, but is not limited thereto.

The optical laminate of the present application may comprise a pressure-sensitive adhesive layer formed on one side or both sides of the optical element. Such a pressure-sensitive adhesive layer comprises a pressure-sensitive adhesive polymer. The pressure-sensitive adhesive layer may comprise the pressure-sensitive adhesive polymer as a main component. That is, the content ratio of the pressure-sensitive adhesive polymer relative to the total weight of the pressure-sensitive adhesive layer may be 55 wt % or more, 60 wt % or more, 65 wt % or more, 70 wt % or more, 75 wt % or more, 80 wt % or more, 85 wt % or more, or 90 wt % or more. The upper limit of the ratio is not particularly limited, which may be, for example, about 98 wt % or less, or 95 wt % or less. Such a pressure-sensitive adhesive polymer may be contained in the pressure-sensitive adhesive layer in a state of being crosslinked by a crosslinking agent as described below.

The characteristics of the pressure-sensitive adhesive layer can be controlled in order to ensure excellent durability under a high-temperature condition, especially, an ultrahigh-temperature condition of 100° C. or higher, and to suppress or prevent a foaming phenomenon and the like even when applied to the low moisture-permeable optical film.

Hereinafter, among physical properties mentioned in the present application, when the measured temperature and/or pressure affects the physical property value, the relevant physical property means a physical property measured at room temperature and/or normal pressure, unless otherwise specified.

In the present application, the term room temperature is a natural temperature without warming or cooling, which may mean, for example, any one temperature in a range of about 10° C. to 30° C., or a temperature of about 25° C. or 23° C. or so.

In the present application, the term normal pressure is a pressure when the pressure is not particularly reduced or increased, which may be 1 atmosphere or so, such as normal atmospheric pressure.

In one example, the pressure-sensitive adhesive layer may exhibit a gel fraction in a predetermined range. For example, the pressure-sensitive adhesive layer may have a gel fraction of about 70 wt % or more calculated by Equation 1 below.

$$\text{Gel content} = B/A \times 100 \quad \text{[Equation 1]}$$

In Equation 1, A is the mass (unit: g) of the pressure-sensitive adhesive layer before immersing it in ethyl acetate, and B represents the dry mass (unit: g) of the insoluble fraction recovered after immersing the pressure-sensitive adhesive layer in ethyl acetate at room temperature for 24 hours. At this time, the insoluble fraction means a component which is filtered through a 200 mesh (#200) sieve, and the dry mass of the insoluble fraction means a mass measured in a state where the solvent is not substantially contained in the relevant insoluble fraction by drying the collected insoluble fraction under an appropriate condition, for example, in a state where a solvent content is about 1 wt % or less, 0.5 wt % or less, or 0.1 wt % or less. Here, the drying condition is not particularly limited as long as the ratio of the solvent contained in the insoluble fraction can be controlled within the above range, and it can be performed under an appropriate condition.

In another example, the gel fraction may be about 75 wt % or more, or about 80 wt % or more, or may be about 95 wt % or less, or 90 wt % or less.

The pressure-sensitive adhesive layer may have a ratio (loss tangent (tan δ) at 100° C./loss tangent (tan δ) at 30° C.) of a loss tangent (tan δ) at 100° C. to a loss tangent (tan δ) at 30° C. of 1.7 or less. Here, the loss tangent (tan δ) is a ratio (G"/G') of a loss elastic modulus (G") to a storage elastic modulus (G'). That is, the loss tangent (tan δ) at 100° C. is a ratio (G"/G') of a loss elastic modulus (G") at 100° C. to a storage elastic modulus (G') at 100° C., and the loss tangent (tan δ) at 30° C. is a ratio (G"/G') of a loss elastic modulus (G") at 30° C. to a storage elastic modulus (G') at 30° C.

Here, the storage elastic modulus (G'), the loss elastic modulus (G") and the loss tangent (tan δ) can be obtained using a dynamic rheometer. The storage elastic modulus (G'), loss elastic modulus (G") and loss tangent (tan δ) can be measured, for example, in a state of setting the measurement mode to the shear mode and setting the measurement frequency to about 1 Hz.

In another example, the ratio (loss tangent (tan δ) at 100° C./loss tangent (tan δ) at 30° C.) may be about 1.68 or less, 1.65 or less, 1.60 or less, 1.55 or less, 1.5 or less, 1.45 or less, 1.4 or less, about 1.35 or less, or may be about 1 or more, about 1.05 or more, about 1.1 or more, about 1.15 or more, about 1.2 or more, or about 1.25 or more.

Also, the pressure-sensitive adhesive layer may have a storage elastic modulus at 30° C. of about 0.06 MPa or more as obtained by the above method. In another example, the storage elastic modulus may be 0.065 MPa or more, 0.07 MPa or more, 0.075 MPa or more, 0.08 MPa or more, 0.085 MPa or more, or 0.09 MPa or more, and may be 0.2 MPa or less, 0.15 MPa or less, or 0.12 MPa or less.

The pressure-sensitive adhesive layer may have room-temperature peel force of about 700 gf/25 mm or more as measured at a peeling speed of 300 mm/min and a peeling angle of 90 degrees with respect to a glass substrate. The peel force may be about 750 gf/25 mm or more, about 800 gf/25 mm or more, about 850 gf/25 mm or more, about 900 gf/25 mm or more, or about 950 gf/25 mm or more. The upper limit of the peel force is not particularly limited, and for example, the peel force may be about 2,000 gf/25 mm or less, about 1,800 gf/25 mm or less, or about 1,500 gf/25 mm or less.

The pressure-sensitive adhesive layer exhibiting the above characteristics can secure excellent durability under a high temperature condition, particularly, an ultrahigh temperature of 100° C. or higher. Furthermore, the pressure-sensitive adhesive layer can suppress or prevent a foaming phenomenon even when applied to a low moisture-permeable optical film.

In order to form the pressure-sensitive adhesive layer having such characteristics, the monomer composition, molecular weight characteristics, degree of crosslinking, etc. of the above-mentioned pressure-sensitive adhesive polymer can be controlled.

Also, in one example, one or two or more of the above-mentioned physical properties may enable the formation of the pressure-sensitive adhesive layer intended in the present application in connection with the composition and the like of the polymer to be described below.

In one example, as the pressure-sensitive adhesive polymer, a polymer having a weight average molecular weight (Mw) of 500,000 or more can be used. In the present application, the term "weight average molecular weight" is a numerical value in terms of standard polystyrene measured by GPC (gel permeation chromatograph), which may also be simply referred to as molecular weight, unless otherwise specified. In another example, the molecular weight (Mw) may be about 600,000 or more, about 700,000 or more, about 800,000 or more, about 900,000 or more, about 1,000,000 or more, about 1,100,000 or more, about 1,200,000 or more, about 1,300,000 or more, about 1,400,000 or more, or about 1,500,000 or more, or may be about 3,000,000 or less, about 2,800,000 or less, about 2,600,000 or less, about 2,400,000 or less, about 2,200,000 or less, or about 2,000,000 or less. In the present application, the unit of the weight average molecular weight is g/mol, unless otherwise specified.

The pressure-sensitive adhesive polymer may be an acrylic pressure-sensitive adhesive polymer. The term acrylic adhesive polymer may mean, as one having a property capable of forming a pressure-sensitive adhesive, a polymer comprising an acrylic monomer unit as a main component. The term acrylic monomer may mean acrylic acid, methacrylic acid or a derivative of acrylic acid or methacrylic acid such as (meth)acrylic acid ester. Here, the (meth)acryl may mean acryl or methacryl. Here, the phrase being included as a main component may also mean a case where the ratio of the relevant component is 55% or more, 60% or more, 65% or more, 70% or more, 75% or more, 80% or more, 85% or more, 90% or more, or 95% or more on the basis of weight. The upper limit of the ratio may be 100%. In addition, the unit contained in the polymer means a state where the monomer forms a main chain and/or a side chain of the polymer through a polymerization reaction.

The pressure-sensitive adhesive polymer may comprise (1) an alkyl (meth)acrylate unit having an alkyl group having 4 or more carbon atoms, (2) an alkyl (meth)acrylate unit having an alkyl group having 3 or less carbon atoms, (3) an aromatic group-containing monomer unit and (4) a polar functional group-containing monomer unit. Such a monomer composition is associated with physical properties of a pressure-sensitive adhesive layer, which are described below, such as gel fraction and peel force, so that the pressure-sensitive adhesive layer can excellently maintain re-workability, cutting ability, lifting and foam inhibiting ability, and the like as well as represent excellent high temperature durability.

Here, as the unit (1), an alkyl (meth)acrylate unit having an alkyl group with 4 or more carbon atoms, for example, an alkyl group with 4 to 14 carbon atoms can be used in consideration of cohesive force, glass transition temperature or adhesion of the pressure-sensitive adhesive, and the like. Such an alkyl (meth)acrylate can be exemplified by n-butyl (meth)acrylate, t-butyl (meth)acrylate, sec-butyl (meth) acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate and tetradecyl (meth)acrylate, and the like, and one or two or more of the foregoing can be applied. Generally, n-butyl acrylate or 2-ethylhexyl acrylate, and the like are used.

The ratio of the unit (1) in the polymer is not particularly limited, but may be in a range of about 50 to 70 wt %. In another example, the ratio may be about 65 wt % or less.

As the unit (2), an alkyl (meth)acrylate unit having an alkyl group with 3 or less carbon atoms is used. Such a unit makes it possible that the pressure-sensitive adhesive ensures good endurance reliability at a high temperature. The monomer capable of forming the unit can be exemplified by methyl (meth)acrylate, ethyl (meth)acrylate, n-propyl (meth)acrylate or isopropyl (meth)acrylate, and the like, and a suitable example is methyl acrylate.

The unit (2) may be included in the pressure-sensitive adhesive polymer in a ratio of about 30 to 65 parts by weight relative to 100 parts by weight of the unit (1). In another example, the ratio may be about 60 parts by weight or less, or 58 parts by weight or less.

As the unit (3), a unit of an aromatic group-containing monomer, for example, a unit of a (meth)acrylate monomer having an aromatic ring is used.

The kind of the aromatic group-containing monomer capable of forming such a unit is not particularly limited, and for example, a monomer of Formula 1 below can be exemplified.

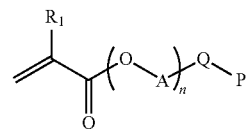

[Formula 1]

In Formula 1, $R_1$ represents hydrogen or alkyl, A represents alkylene, n represents an integer in a range of 0 to 3, Q represents a single bond, —O—, —S— or alkylene, and P represents an aromatic ring.

In Formula 1, a single bond means a case where the atomic groups on both sides are directly bonded to each other without mediating a separate atom.

In Formula 1, $R_1$ may be, for example, hydrogen or alkyl of 1 to 4 carbon atoms, or may be hydrogen, methyl or ethyl.

In the definition of Formula 1, A may be alkylene of 1 to 12 carbon atoms or 1 to 8 carbon atoms, and for example, may be methylene, ethylene, hexylene or octylene.

In Formula 1, n may be, for example, a number in the range of 0 to 2, or may be 0 or 1.

In Formula 1, Q may be a single bond, —O— or —S—.

In Formula 1, P is a substituent derived from an aromatic compound, which may be, for example, a functional group derived from an aromatic ring having 6 to 20 carbon atoms, for example, phenyl, biphenyl, naphthyl or anthracenyl.

In Formula 1, the aromatic ring may be optionally substituted by one or more substituents, where a specific example of the substituent may include halogen or alkyl, or halogen or alkyl of 1 to 12 carbon atoms, or chlorine, bromine, methyl, ethyl, propyl, butyl, nonyl or dodecyl, but is not limited thereto.

A specific example of the compound of Formula 1 may include one or a mixture of two or more of phenoxyethyl (meth)acrylate, benzyl (meth)acrylate, 2-phenylthio-1-ethyl (meth)acrylate, 6-(4,6-dibromo-2-isopropylphenoxy)-1-hexyl (meth)acrylate, 6-(4,6-dibromo-2-sec-butylphenoxy)-1-hexyl (meth)acrylate, 2,6-dibromo-4-nonylphenyl (meth) acrylate, 2,6-dibromo-4-dodecylphenyl (meth)acrylate, 2-(1-naphthyloxy)-1-ethyl (meth)acrylate, 2-(2-naphthyloxy)-1-ethyl (meth)acrylate, 6-(1-naphthyloxy)-1-hexyl (meth)acrylate, 6-(2-naphthyloxy)-1-hexyl (meth)acrylate, 8-(1-naphthyloxy)-1-octyl (meth)acrylate and 8-(2-naphthyloxy)-1-octyl (meth)acrylate, but is not limited thereto.

The unit (3) may be included in the pressure-sensitive adhesive polymer in a ratio of about 20 to 45 parts by weight relative to 100 parts by weight of the unit (1). In another example, the ratio may be about 40 parts by weight or less, about 35 parts by weight or less, or about 30 parts by weight or less.

As the unit (4), a unit of a monomer having a hydroxyl group or a carboxyl group as a polar functional group may be used. Such a unit may serve to impart cohesive force or the like through a reaction with a cross-linking agent or the like, which is described below, if necessary. As the monomer having a polar functional group, hydroxyalkyl (meth)acrylate having a hydroxyalkyl group having a carbon number in a range of 3 to 6 or a carboxyl group-containing monomer may be used for ensuring adequate high temperature reliability and the like.

The hydroxyalkyl (meth)acrylate having a hydroxyalkyl group having a carbon atom in the range of 3 to 6 can be exemplified by 3-hydroxypropyl (meth)acrylate, 4-hydroxybutyl (meth)acrylate or 6-hydroxyhexyl (meth)acrylate, and the like, and in one example, 4-hydroxybutyl (meth)acrylate can be used.

The carboxyl group-containing monomer can be exemplified by (meth)acrylic acid, 2-(meth)acryloyloxyacetic acid, 3-(meth)acryloyloxypropyl acid, 4-(meth)acryloyloxybutyric acid, an acrylic acid dimer, itaconic acid, maleic acid and maleic anhydride, and the like, and generally, acrylic acid can be applied.

However, in the case where the pressure-sensitive adhesive layer is used adjacent to an electrode such as ITO (indium tin oxide), if a large amount of carboxyl groups are contained in the pressure-sensitive adhesive layer, they may cause corrosion of the electrode to adversely affect the performance of the device, so that a component having a carboxyl group may not be applied, or the application ratio may also be limited. Specifically, the unit (4) may be included in the pressure-sensitive adhesive polymer in a ratio of about 1 to 6 parts by weight relative to 100 parts by weight of the unit (1). In another example, the ratio may be about 1.5 parts by weight or more, or may be about 5.8 parts by weight or less, about 5.5 parts by weight or less, about 5 parts by weight or less, about 4.5 parts by weight or less, about 4 parts by weight or less or about 3.5 parts by weight or less. In particular, when the unit (4) is a carboxyl group-containing monomer unit, the ratio may be about 1 part by weight or more, or about 1.5 parts by weight or more, or may be about 4.5 parts by weight or less, about 4 parts by weight or less, about 3.5 parts by weight or less, about 3 parts by weight or less, about 2.5 parts by weight or less, or about 2 parts by weight or less, relative to 100 parts by weight of the unit (1).

As the pressure-sensitive adhesive polymer contains the above-mentioned monomer units and, if necessary, the ratio thereof is adjusted, stable durability at a high temperature is ensured in the pressure-sensitive adhesive layer and other physical properties required for the pressure-sensitive adhesive layer are also stably maintained, where even in the case of being disposed adjacent to the electrode, corrosion of the relevant electrode or the like cannot be caused.

The pressure-sensitive adhesive polymer may further comprise other known units in addition to the above-mentioned units, if necessary. For example, the pressure-sensitive adhesive polymer may comprise polymerized units of a multifunctional (meth)acrylate. Here, the multifunctional (meth)acrylate may mean a (meth)acrylate monomer, oligomer or polymer having two or more functional groups, for example, radically polymerizable functional groups. The functional group of the multifunctional (meth)acrylate compound may be, for example, an acryloyl group or a methacryloyl group. Also, the functional groups in the multifunctional (meth)acrylate compound may be the same or different from each other.

In one example, the multifunctional (meth)acrylate may be a trifunctional (meth)acrylate compound such as trimethylolpropane tri(meth)acrylate, ethoxylated trimethylolpropane tri(meth)acrylate, propoxylated trimethylolpropane tri (meth)acrylate, tris-2-hydroxyethylisocyanurate tri(meth) acrylate, glycerin tri(meth)acrylate, pentaerythritol tri(meth) acrylate, dipentaerythritol tri(meth)acrylate or ditrimethylolpropane tri(meth)acrylate.

Also, the multifunctional (meth)acrylate may be a multifunctional (met)acrylate having trifunctionality or more such as pentaerythritol tetra(meth)acrylate, ditrimethylolpropane tetra(meth)acrylate, dipentaerythritol tetra(meth) acrylate, dipentaerythritol penta(meth)acrylate, ditrimethylolpropane penta(meth)acrylate, dipentaerythritol hexa (meth)acrylate or ditrimethylolpropane hexa(meth)acrylate.

Such a pressure-sensitive adhesive polymer may be prepared by a known polymerization method applying the above-mentioned monomers.

The pressure-sensitive adhesive layer may further comprise a crosslinking agent, where the crosslinking agent may crosslink the pressure-sensitive adhesive polymer.

As the crosslinking agent, a known crosslinking agent may be used without any particular limitation, and for example, an isocyanate crosslinking agent, an epoxy crosslinking agent, an aziridine crosslinking agent and a metal chelating crosslinking agent, and the like may be used.

As the isocyanate crosslinking agent, a diisocyanate such as tolylene diisocyanate, xylene diisocyanate, diphenylmethane diisocyanate, hexamethylene diisocyanate, isophorone diisocyanate, tetramethylxylene diisocyanate or naphthalene diisocyanate, or a reaction product of one or more of the diisocyanates with a polyol (e.g., trimethylol propane), and the like can be used.

As the epoxy crosslinking agent, one or more selected from the group consisting of ethylene glycol diglycidyl ether, triglycidyl ether, trimethylolpropane triglycidyl ether, N,N,N',N'-tetraglycidylethylenediamine and glycerin diglycidyl ether can be used; as the aziridine crosslinking agent, one or more selected from the group consisting of N,N-toluene-2,4-bis(1-aziridinecarboxamide), N,N'-diphenylmethane-4,4'-bis(1-aziridinecarboxamide), triethylenemelamine, bisisophthaloyl-1-(2-methylaziridine) and tri-1-aziridinylphosphine oxide can be used; and as the metal chelating crosslinking agent, a compound in which a polyvalent metal such as aluminum, iron, zinc, tin, titanium, antimony, magnesium and/or vanadium is coordinated to acetylacetone or ethyl acetoacetate, and the like can be used, without being limited thereto.

The crosslinking agent can be used in an amount of 0.001 parts by weight to 10 parts by weight relative to 100 parts by weight of the pressure-sensitive adhesive polymer, and under this ratio, it is possible to prevent deterioration of endurance reliability such as occurrence of interlayer peeling or a lifting phenomenon, and the like, while appropriately maintaining cohesive force of the pressure-sensitive adhesive. In another example, the ratio may be about 0.005 parts by weight or more, 0.01 parts by weight or more, 0.05 parts by weight or more, or 0.1 parts by weight or more, and may be about 9 parts by weight or less, 8 parts by weight or less, 7 parts by weight or less, 6 parts by weight or less, 5 parts by weight or less, 4 parts by weight or less, 3 parts by weight or less, 2 parts by weight or less, or 1.5 parts by weight or less.

The pressure-sensitive adhesive layer may further comprise other known additives as needed, in addition to the above-mentioned components. Such an additive can be exemplified by one or more selected from the group consisting of a coupling agent such as a silane coupling agent; an antistatic agent; a tackifier; an ultraviolet stabilizer; an antioxidant; a colorant; a reinforcing agent; a filler; a defoamer; a surfactant; a photopolymerizable compound such as a multifunctional acrylate; and a plasticizer, but is not limited thereto.

The present application also relates to a display device comprising such an optical laminate. The device may comprise, for example, a display panel to which the optical laminate is attached via the above-mentioned pressure-sensitive adhesive layer. Here, the type of the display panel is not particularly limited, which may be, for example, a known LCD panel or OLED panel, and the like. Furthermore, the position or the like where the optical laminate is attached to the panel can also follow a known manner.

Advantageous Effects

The optical laminate of the present application can have stable durability even at a high temperature, particularly an ultrahigh temperature of about 100° C. or higher.

The optical laminate of the present application can also suppress or prevent a foaming phenomenon and the like in the pressure-sensitive adhesive layer.

The optical laminate of the present application can also have excellent other physical properties required in the optical laminate and cannot cause, even in the case of being disposed adjacent to an electrode, corrosion of the relevant electrode.

MODE FOR INVENTION

Hereinafter, the present application will be specifically described by way of examples, but the scope of the present application is not limited by the following examples.

1. Method of Measuring Peel Force

The pressure-sensitive adhesive polarizing plates prepared in Examples or Comparative Examples were each cut to a width of 25 mm and a height of 200 mm to prepare a specimen, and the specimen was attached to a glass plate via the pressure-sensitive adhesive layer. The peel force was measured while peeling off the pressure-sensitive adhesive polarizing plate at a peel angle of 90 degrees and a peel rate of 300 mm/min at an elapsed time of 1 hour after attachment of the specimen.

2. Method of Measuring Gel Fraction

After holding each of the pressure-sensitive adhesive layers prepared in Examples or Comparative Examples at a constant temperature and humidity room (temperature: 23° C., relative humidity: 50%) for 7 days, 0.2 g (=A in gel fraction measurement equation) was collected. The collected pressure-sensitive adhesive layer was completely immersed in 50 mL of ethyl acetate, and then stored in a dark room at room temperature for 1 day. Subsequently, a portion (insoluble fraction) not dissolved in ethyl acetate was collected in a 200 mesh (#200) stainless steel wire net and dried at 150° C. for 30 minutes to measure the mass (dry mass of insoluble fraction=B in gel fraction measurement equation). Subsequently, the gel fraction (unit: %) was measured by substituting the measurement result into the following equation.

Gel fraction=$B/A$×100  <Gel fraction measurement equation>

A: mass of the pressure-sensitive adhesive (0.2 g)
B: dry mass of insoluble fraction (unit: g)

3. Method of Measuring Elastic Modulus

The pressure-sensitive adhesive compositions prepared in Examples or Comparative Examples were each coated between two release films and aged for 7 days under a constant temperature and humidity condition (temperature: 23° C., relative humidity: 50%) to prepare a pressure-sensitive adhesive layer having a thickness of about 22 μm. Subsequently, the pressure-sensitive adhesive between the release films was cut to prepare a circumferential specimen of 8 mm×1 mm (=diameter×thickness), and then using a dynamic rheometer (ARES, RDA, TA Instruments Inc.), the storage elastic modulus, loss elastic modulus and loss tangent at a temperature of 100° C. or 30° C. were measured while applying shear stress between parallel plates at a frequency of 1 Hz under a shear mode. The loss tangent was the ratio (G"/G') of the loss elastic modulus (G") to the storage elastic modulus (G'), and the loss tangent at 100° C. was evaluated to the loss tangent at 30° C.

4. ITO Corrosion Test

The pressure-sensitive adhesive compositions prepared in Examples or Comparative Examples were each laminated on a TAC (triacetyl cellulose) film having a thickness of 40 μm and aged for 7 days under a constant temperature and humidity condition (temperature: 23° C., relative humidity: 50%) to prepare a pressure-sensitive adhesive layer. A typical ITO (indium tin oxide) film was cut to have a width of about 50 mm or so and a height of about 30 mm or so to prepare an ITO film specimen. Subsequently, a silver paste was applied on the ITO film specimen to both ends in the transverse direction at a width of 10 mm or so, respectively. Then, the pressure-sensitive adhesive layer was cut to have a width of about 40 mm or so and a height of about 30 mm or so, and attached to the ends on the silver paste at an interval of 5 mm or so to prepare the specimen for the ITO corrosion test. The specimen for testing was stored for about 250 hours under a high temperature and humidity condition (temperature: 85° C., relative humidity: 85%), and then the change rate of resistance was evaluated with a linear resistance meter (Hioki 3244-60 card hitester) as compared with before initial introduction.

5. High Temperature Durability

The pressure-sensitive adhesive polarizing plates of Examples or Comparative Examples were each cut to have a width of about 140 mm or so and a height of about 90 mm or so to prepare a specimen, which was attached to a glass substrate at a pressure of 5 kg/cm². The attachment was performed in a clean room so that bubbles or foreign materials were not generated. Subsequently, the prepared sample was maintained in an autoclave for 15 minutes under conditions of a temperature of 50° C. and a pressure of 5 kg/cm².

After maintaining the sample at a temperature of about 100° C. for about 500 hours, the durability was evaluated according to the following criteria.

<Evaluation Criteria>
O: no bubbling and peeling occurred
Δ: bubbling and/or peeling occurred
X: severe bubbling and/or peeling occurred 6. Evaluation of Foam Size The foam size was evaluated by observing bubbles generated in an optical laminate with a microscope and measuring the size in micrometers. When bubbles were not observed, it was represented as "no" in Tables 2 and 3 below, and when the pressure-sensitive adhesive layer was peeled from the polarizing plate, it was represented as "peeling" in Tables 2 and 3 below.

Preparation Example 1. Preparation of Pressure-Sensitive Adhesive Polymer (A)

n-Butyl acrylate (n-BA), benzyl acrylate (BzA), methyl acrylate (MA) and hydroxybutyl acrylate (4-HBA) were introduced into an 1 L reactor equipped with a cooling device for nitrogen gas refluxing and easy temperature control in a weight ratio of 63:15:20:2 (n-BA:BzA:MA:4-HBA) and 100 parts by weight of ethyl acetate (EAc) was introduced as a solvent. Subsequently, nitrogen gas was purged for 1 hour to remove oxygen, and then, 0.03 parts by weight of azobisisobutyronitrile (AIBN) diluted to a concentration of 50 wt % in ethyl acetate was introduced as a reaction initiator and reacted for 8 hours to prepare a copolymer (A) having a molecular weight (Mw) of about 1,800,000 g/mol or so.

Preparation Examples 2 to 8. Preparation of Pressure-Sensitive Adhesive Polymers B to H Copolymers were prepared in the same manner as in Preparation Example 1, except that the compositions as shown in Table 1 below were adopted.

TABLE 1

| | Preparation Example | | | | | | | |
|---|---|---|---|---|---|---|---|---|
| | 1 | 2 | 3 | 4 | 5 | 6 | 7 | 8 |
| | A | B | C | D | E | F | G | H |
| n-BA | 63 | 64 | 81 | 84 | 64 | 54 | 84 | 51.7 |
| BzA | 15 | 15 | 15 | 15 | 15 | 15 | 15 | 30 |
| MA | 20 | 20 | | | 20 | 30 | | 15 |
| 4-HBA | 2 | | | 1 | 1 | 1 | | 3 |
| AA | | 1 | 4 | | | | 1 | |
| PETA | | | | | | | | 0.3 |
| Mw | 1,800,000 | 1,650,000 | 1,300,000 | 1,500,000 | 1,800,000 | 1,850,000 | 1,650,000 | 1,300,000 |

Content unit: part by weight, n-BA: n-butyl acrylate, BzA: benzyl acrylate, MA: methyl acrylate, 4-HBA: 4-hydroxybutyl acrylate, AA: acrylic acid, PETA: pentaerythritol triacrylate, Mw: weight average molecular weight (unit: g/mol)

Example 1

Production of Pressure-Sensitive Adhesive Composition and Pressure-Sensitive Adhesive Layer An isocyanate crosslinking agent (T-39M, Japan Soken Co., Ltd.) was combined to the copolymer (A) of Preparation Example 1 in an amount of about 0.12 parts by weight relative to 100 parts by weight of the solid content of the copolymer (A). Subsequently, a di-n-butyltin dilaurate catalyst (C-700, Hannong Chemicals Inc.) diluted with ethyl acetate at a concentration of about 0.5 wt % was combined thereto in an amount of about 0.001 parts by weight relative to 100 parts by weight of the solid content of the copolymer (A). Thereafter, as a crosslinking retarder, acetyl acetone was further combined thereto in an amount of about 1 part by weight relative to 100 parts by weight of the solid content of the copolymer (A) and then, diluted to a proper concentration to prepare a uniformly mixed pressure-sensitive adhesive composition. The pressure-sensitive adhesive composition was coated on a conventional release paper and dried to produce a uniform pressure-sensitive adhesive layer having a thickness of 22 μm.

Production of Polarizing Plate

A polyvinyl alcohol (PVA) film (Japan Synthetic Co., M2004) having a thickness of about 60 μm was immersed in a dyeing solution at about 30° C. containing about 0.05 wt % of iodine and about 1.5 wt % of potassium iodide for about 60 seconds to be subjected to dyeing. Subsequently, the dyed PVA film was immersed in a crosslinking solution at about 30° C. containing about 0.5 wt % of boron and about 3.0 wt % of potassium iodide for about 60 seconds to be subjected to crosslinking. Thereafter, the crosslinked PVA film was stretched at a draw ratio of about 5.5 times using a roll-to-roll stretching method. The stretched PVA film was washed with water by immersing it in ion-exchanged water at about 30° C. for about 20 seconds and immersed in a solution at about 30° C. containing about 2.0 wt % of zinc nitrate and about 5.5 wt % of potassium iodide for about 10 seconds. Thereafter, the PVA film was dried at a temperature of about 80° C. for about 200 seconds to produce a polarizer. The potassium content in the produced polarizer was about 0.8 wt %, and the zinc content was about 0.17 wt %. Subsequently, a COP (cycloolefin polymer) film having a water vapor transmission rate of about 5 g/(m²·day) or so as measured at about 37° C. and 88.5% (error±0.5%) relative humidity for about 24 hours according to a standard (ASTM F1249, ISO15506-3) by a 7002 Water Vapor Permeation Analyzer (Systech, Ill.) instrument was bonded to one side of the polarizer with an adhesive. Subsequently, a TAC (triacetyl cellulose) film as a known polarizer protective film was bonded to the other side of the polarizer with an adhesive to prepare a polarizing plate.

Production of Optical Laminate (Pressure-Sensitive Adhesive Polarizing Plate)

The produced pressure-sensitive adhesive layer was stuck and processed to the COP film surface of the polarizing plate to produce a pressure-sensitive polarizing plate (optical laminate).

Example 2

A pressure-sensitive adhesive layer and a pressure-sensitive polarizing plate were produced in the same manner as in Example 1, except that a uniformly mixed pressure-sensitive adhesive composition obtained by combining a toluene diisocyanate crosslinking agent (T-706BB, Japan Soken Co., Ltd.) to the copolymer (B) of Preparation Example 2 in an amount of about 1 part by weight relative to 100 parts by weight of the solid content of the copolymer (B), further combining an epoxy crosslinking agent (T-743L, Japan Soken Co., Ltd.) thereto in an amount of about 0.007 parts by weight relative to 100 parts by weight of the solid content of the copolymer (B) and then, diluting the mixture to a proper concentration was used.

Example 3

A pressure-sensitive adhesive layer and a pressure-sensitive polarizing plate were produced in the same manner as in Example 1, except that a uniformly mixed pressure-sensitive adhesive composition obtained by combining a toluene diisocyanate crosslinking agent (T-706BB, Japan Soken Co., Ltd.) to the copolymer (B) of Preparation Example 2 in an amount of about 1.2 parts by weight relative to 100 parts by weight of the solid content of the copolymer (B), further combining an epoxy crosslinking agent (T-743L, Japan Soken Co., Ltd.) thereto in an amount of about 0.005 parts by weight relative to 100 parts by weight of the solid content of the copolymer (B) and then, diluting the mixture to a proper concentration was used.

Example 4

A pressure-sensitive adhesive layer and a pressure-sensitive polarizing plate were produced in the same manner as in Example 1, except that a uniformly mixed pressure-sensitive adhesive composition obtained by combining a crosslinking agent (T-39M, Japan Soken Co., Ltd.) to the copolymer (E) of Preparation Example 5 in an amount of about 0.12 parts by weight relative to 100 parts by weight of the solid content of the copolymer (E), subsequently combining a di-n-butyltin dilaurate catalyst (C-700, Hannong Chemicals Inc.) diluted with ethyl acetate at a concentration of about 0.5 wt % thereto in an amount of about 0.006 parts by weight relative to 100 parts by weight of the solid content of the copolymer (E) and diluting the mixture to a proper concentration was used.

Example 5

A pressure-sensitive adhesive layer and a pressure-sensitive polarizing plate were produced in the same manner as in Example 1, except that a uniformly mixed pressure-sensitive adhesive composition obtained by combining a crosslinking agent (T-39M, Japan Soken Co., Ltd.) to the copolymer (F) of Preparation Example 6 in an amount of about 0.12 parts by weight relative to 100 parts by weight of the solid content of the copolymer (F), subsequently combining a di-n-butyltin dilaurate catalyst (C-700, Hannong Chemicals Inc.) diluted with ethyl acetate at a concentration of about 0.5 wt % thereto in an amount of about 0.006 parts by weight relative to 100 parts by weight of the solid content of the copolymer (F) and diluting the mixture to a proper concentration was used.

Example 6

A pressure-sensitive adhesive layer and a pressure-sensitive polarizing plate were produced in the same manner as in Example 1, except that a uniformly mixed pressure-sensitive adhesive composition obtained by combining a crosslinking agent (T-39M, Japan Soken Co., Ltd.) to the copolymer (H) of Preparation Example 8 in an amount of about 0.14 parts by weight relative to 100 parts by weight of the solid content of the copolymer (H), subsequently combining a di-n-butyltin dilaurate catalyst (C-700, Hannong Chemicals Inc.) diluted with ethyl acetate at a concentration of about 0.5 wt % thereto in an amount of about 0.001 parts by weight relative to 100 parts by weight of the solid content of the copolymer (H), further combining as a crosslinking retarder acetyl acetone thereto in an amount of about 1 part by weight relative to 100 parts by weight of the solid content of the copolymer (H), and then diluting the mixture to a proper concentration was used.

Comparative Example 1

A pressure-sensitive adhesive layer and a pressure-sensitive polarizing plate were produced in the same manner as in Example 1, except that a uniformly mixed pressure-sensitive adhesive composition obtained by combining a toluene diisocyanate crosslinking agent (T-706BB, Japan Soken Co., Ltd.) to the copolymer (C) of Preparation Example 3 in an amount of about 1.7 parts by weight relative to 100 parts by weight of the solid content of the copolymer (C), further combining an epoxy crosslinking agent (T-743L, Japan Soken Co., Ltd.) thereto in an amount of about 0.005 parts by weight relative to 100 parts by weight of the solid content of the copolymer (B), and then diluting the mixture to a proper concentration was used.

Comparative Example 2

A pressure-sensitive adhesive layer and a pressure-sensitive polarizing plate were produced in the same manner as in Example 1, except that a uniformly mixed pressure-sensitive adhesive composition obtained by combining a crosslinking agent (T-39M, Japan Soken Co., Ltd.) to the copolymer (D) of Preparation Example 4 in an amount of about 0.08 parts by weight relative to 100 parts by weight of the solid content of the copolymer (D), subsequently combining a di-n-butyltin dilaurate catalyst (C-700, Hannong Chemicals Inc.) diluted with ethyl acetate at a concentration of about 0.5 wt % thereto in an amount of about 0.006 parts by weight relative to 100 parts by weight of the solid content of the copolymer (D) and diluting the mixture to a proper concentration was used.

Comparative Example 3

A pressure-sensitive adhesive layer and a pressure-sensitive polarizing plate were produced in the same manner as in Example 1, except that a uniformly mixed pressure-sensitive adhesive composition obtained by combining a crosslinking agent (T-39M, Japan Soken Co., Ltd.) to the copolymer (E) of Preparation Example 5 in an amount of about 0.08 parts by weight relative to 100 parts by weight of the solid content of the copolymer (E), combining a di-n-butyltin dilaurate catalyst (C-700, Hannong Chemicals Inc.) diluted with ethyl acetate at a concentration of about 0.5 wt % thereto in an amount of about 0.006 parts by weight relative to 100 parts by weight of the solid content of the copolymer (E) and diluting the mixture to a proper concentration was used.

Comparative Example 4

A pressure-sensitive adhesive layer and a pressure-sensitive polarizing plate were produced in the same manner as in Example 1, except that a uniformly mixed pressure-sensitive adhesive composition obtained by combining a toluene diisocyanate crosslinking agent (T-706BB, Japan Soken Co., Ltd.) to the copolymer (G) of Preparation Example 7 in an amount of about 1.0 part by weight relative to 100 parts by weight of the solid content of the copolymer (G), further combining an epoxy crosslinking agent (T-743L, Japan Soken Co., Ltd.) thereto in an amount of about 0.005 parts by weight relative to 100 parts by weight of the solid content of the copolymer (B), and then diluting the mixture to a proper concentration was used.

Comparative Example 5

A pressure-sensitive adhesive layer and a pressure-sensitive polarizing plate were produced in the same manner as in Example 1, except that a uniformly mixed pressure-sensitive adhesive composition obtained by combining a toluene diisocyanate crosslinking agent (T-706BB, Japan Soken Co., Ltd.) to the copolymer (B) of Preparation Example 2 in an amount of about 0.8 parts by weight relative to 100 parts by weight of the solid content of the copolymer (C), further combining an epoxy crosslinking agent (T-743L, Japan Soken Co., Ltd.) thereto in an amount of about 0.005 parts by weight relative to 100 parts by weight of the solid content of the copolymer (B), and then diluting the mixture to a proper concentration was used.

The evaluation results of Examples and Comparative Examples above were summarized and described in Tables 2 and 3 below.

TABLE 2

| | Example | | | | | |
|---|---|---|---|---|---|---|
| | 1 | 2 | 3 | 4 | 5 | 6 |
| Peel Force (gf/25 mm) | 750 | 1000 | 1000 | 850 | 1000 | 800 |
| Gel Fraction (wt %) | 83 | 82 | 80 | 75 | 79 | 71 |
| Elastic Modulus (G', Pa) | 91000 | 82000 | 89000 | 72000 | 90000 | 82000 |
| Loss Tangent Ratio | 1.36 | 1.33 | 1.33 | 1.63 | 1.33 | 1.5 |
| High Temperature Durability | O | O | O | O | O | O |
| Foam Size (size) | no | no | no | no | no | no |
| ITO Resistance Change Rate | 13% | 85% | 80% | 20% | 22% | 20% |

Loss Tangent Ratio: loss tangent (tanδ) at 100° C./loss tangent (tanδ) at 30° C.

TABLE 3

| | Comparative Example | | | | |
|---|---|---|---|---|---|
| | 1 | 2 | 3 | 4 | 5 |
| Peel Force (gf/25 mm) | 900 | 500 | 900 | 700 | 900 |
| Gel Fraction (wt %) | 80 | 72 | 72 | 76 | 75 |
| Elastic Modulus(G', Pa) | 88000 | 44000 | 63000 | 80000 | 80000 |
| Loss Tangent Ratio | 1.32 | more than 1.7 | 1.84 | more than 1.7 | 1.73 |
| High Temperature Durability | O | X | O | X | O |
| Foam Size (size) | no | Peeling | 230 | peeling | 160 |
| ITO Resistance Change Rate | 350% | 20% | 18% | 83% | 86% |

Loss Tangent Ratio: loss tangent (tanδ) at 100° C./loss tangent (tanδ) at 30° C.

The invention claimed is:

1. An optical laminate comprising:
   an optical element including an optical film having a water vapor transmission rate of 100 g/(m²·day) or less as measured at a temperature of 37° C. and 88.5% relative humidity for 24 hours; and
   a pressure-sensitive adhesive layer formed on a side of the optical element,
   wherein the pressure-sensitive adhesive layer comprises a pressure-sensitive adhesive polymer having an alkyl (meth)acrylate unit having an alkyl group with 4 or more carbon atoms, an alkyl (meth)acrylate unit having an alkyl group with 3 or less carbon atoms, an aromatic group-containing monomer unit and a polar functional group-containing monomer unit that has a carboxyl group,
   wherein the polar functional group-containing monomer unit is present in an amount of 1.5 to 4.5 parts by weight relative to 100 parts by weight of the alkyl (meth)acrylate unit having an alkyl group with 4 or more carbon atoms;
   wherein the pressure-sensitive adhesive layer has a ratio of a loss tangent (tan δ) at 100° C. to a loss tangent (tan δ) at 30° C. of 1.7 or less, and
   wherein the pressure-sensitive adhesive layer has a gel fraction of 70 wt % or more, according to Equation 1 below:

$$\text{Gel content} = B/A \times 100 \quad [\text{Equation 1}]$$

wherein, A is a mass (unit: g) of the pressure-sensitive adhesive layer before immersing the pressure-sensitive adhesive layer in ethyl acetate, and B is a dry mass (unit: g) of an insoluble fraction recovered after immersing the pressure-sensitive adhesive layer in ethyl acetate at room temperature for 24 hours, wherein an amount of the alkyl (meth)acrylate unit having an alkyl group with 4 or more carbon atoms in the pressure-sensitive adhesive polymer is in a range of 50 wt % to 70 wt %, wherein the alkyl (meth)acrylate unit having an alkyl group with 3 or less carbon atoms is included in the pressure-sensitive adhesive polymer in an amount of 30 to 65 parts by weight relative to 100 parts by weight of the alkyl (meth)acrylate unit having an alkyl group with 4 or more carbon atoms.

2. The optical laminate according to claim 1, wherein the optical film having a water vapor transmission rate of 100 g/(m²·day) or less as measured at a temperature of 37° C. and 88.5% relative humidity for 24 hours is a cycloolefin polymer film, an acrylic film or a polyester film.

3. The optical laminate according to claim 1, wherein the optical element is a polarizing plate.

4. The optical laminate according to claim 3, wherein the polarizing plate comprises a polarizer and the optical film formed on a side of the polarizer.

5. The optical laminate according to claim 4, wherein the polarizer is a polyvinyl alcohol polarizer comprising a potassium component and a zinc component.

6. The optical laminate according to claim 5, wherein a ratio (K/Zn) of the potassium component (K) and the zinc component (Zn) in the polyvinyl alcohol polarizer is in a range of 0.2 to 6.

7. The optical laminate according to claim 5, wherein the potassium component is included in an amount of 0.1 to 2 wt % based on a total weight of the polyvinyl alcohol polarizer.

8. The optical laminate according to claim 1, wherein an amount of the alkyl (meth)acrylate unit having an alkyl group with 4 or more carbon atoms in the pressure-sensitive adhesive polymer is in a range of 50 wt % to 65 wt %.

9. The optical laminate according to claim 1, wherein the alkyl (meth)acrylate unit having an alkyl group with 3 or less carbon atoms is a methyl acrylate unit.

10. The optical laminate according to claim 1, wherein the alkyl (meth)acrylate unit having an alkyl group with 3 or less carbon atoms is included in the pressure-sensitive adhesive polymer in an amount of 30 to 58 parts by weight relative to 100 parts by weight of the alkyl (meth)acrylate unit having an alkyl group with 4 or more carbon atoms.

11. The optical laminate according to claim 1, wherein the aromatic group-containing monomer is represented by Formula 1 below:

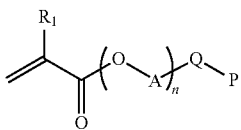

[Formula 1]

wherein, R1 represents hydrogen or alkyl, A represents alkylene, n represents an integer in a range of 0 to 3, Q represents a single bond, —O—, —S— or alkylene, and P represents an aromatic ring.

12. The optical laminate according to claim 1, wherein the aromatic group-containing monomer unit is included in the pressure-sensitive adhesive polymer in an amount of 20 to 45 parts by weight relative to 100 parts by weight of the alkyl (meth)acrylate unit having an alkyl group with 4 or more carbon atoms.

13. The optical laminate according to claim 1, wherein the polar functional group-containing monomer unit is selected from a group consisting of (meth)acrylic acid, 2-(meth)acryloyloxyacetic acid, 3-(meth)acryloyloxypropyl acid, 4-(meth)acryloyloxybutyric acid, an acrylic acid dimer, itaconic acid, maleic acid and maleic anhydride.

14. The optical laminate according to claim 1, wherein the polar functional group-containing monomer unit is included in the pressure-sensitive adhesive polymer in an amount of 1.5 to 2 parts by weight relative to 100 parts by weight of the alkyl (meth)acrylate unit having an alkyl group with 4 or more carbon atoms.

15. The optical laminate according to claim 14, wherein the polar functional group-containing monomer unit is selected from a group consisting of (meth)acrylic acid, 2-(meth)acryloyloxyacetic acid, 3-(meth)acryloyloxypropyl acid, 4-(meth)acryloyloxybutyric acid, an acrylic acid dimer, itaconic acid, maleic acid and maleic anhydride.

16. The optical laminate according to claim 1, wherein the pressure-sensitive adhesive layer has a room temperature storage elastic modulus of 0.06 MPa or more.

17. The optical laminate according to claim 1, wherein the pressure-sensitive adhesive layer further comprises a crosslinking agent for crosslinking the pressure-sensitive adhesive polymer.

18. A display device comprising a display panel to which the optical laminate of claim 1 is attached via the pressure-sensitive adhesive layer.

19. The display device according to claim 18, further comprising an electrode wherein the pressure-sensitive adhesive layer directly contacts the electrode.

20. The optical laminate according to claim 1, wherein the pressure-sensitive adhesive layer has a room temperature storage elastic modulus from 0.06 MPa to 0.2 MPa.

* * * * *